(12) United States Patent
Akers et al.

(10) Patent No.: US 9,229,948 B2
(45) Date of Patent: Jan. 5, 2016

(54) SELF-GOVERNED CONTENTION-AWARE APPROACH TO SCHEDULING FILE DEFRAGMENTATION

(71) Applicant: Oracle International Corporation, Redwood Shores, CA (US)

(72) Inventors: David Akers, Merrimack, NH (US); Diane Lebel, Methuen, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 34 days.

(21) Appl. No.: 13/691,599

(22) Filed: Nov. 30, 2012

(65) Prior Publication Data

US 2014/0156610 A1 Jun. 5, 2014

(51) Int. Cl.
*G06F 17/30* (2006.01)

(52) U.S. Cl.
CPC .. *G06F 17/30135* (2013.01); *G06F 2206/1004* (2013.01)

(58) Field of Classification Search
CPC .................. G06F 17/30135; G06F 2206/1004
USPC ......................................................... 707/693
See application file for complete search history.

(56) References Cited

U.S. PATENT DOCUMENTS

| | | | | |
|---|---|---|---|---|
| 6,496,913 B1* | 12/2002 | Taugher et al. | ........ | 707/999.202 |
| 8,019,799 B1* | 9/2011 | Batterywala | ................. | 707/822 |
| 8,051,115 B2* | 11/2011 | Biller | ............................ | 707/823 |
| 8,280,853 B1* | 10/2012 | Lai et al. | ....................... | 707/651 |
| 2003/0101383 A1* | 5/2003 | Carlson | .......................... | 714/42 |
| 2004/0148476 A1* | 7/2004 | Altare | ............................ | 711/159 |
| 2005/0165856 A1* | 7/2005 | Fellenstein et al. | ........... | 707/200 |
| 2006/0149899 A1* | 7/2006 | Zimmer et al. | ................ | 711/112 |
| 2008/0263059 A1* | 10/2008 | Coca et al. | .................... | 707/100 |
| 2008/0313639 A1* | 12/2008 | Kumar et al. | ................. | 718/104 |
| 2009/0327370 A1* | 12/2009 | Schmidt | ........................ | 707/205 |

(Continued)

OTHER PUBLICATIONS

Sourav Dutta et al., "Service Deactivation Aware Placement and Defragmentation in Enterprise Clouds" CNSM'11 Proceedings of the 7th International Conference on Network and Services Management, 2011, 9 pages.

(Continued)

*Primary Examiner* — Rehana Perveen
*Assistant Examiner* — Tiffany Thuy Bui
(74) *Attorney, Agent, or Firm* — Vista IP Law Group, LLP (57) ABSTRACT

A method, system, and computer program product for file storage defragmentation on a cluster of nodes. The method for self-governed, contention-aware scheduling of file defragmentation operations commences by calculating a score for candidate files of a storage volume, where the score is based on a fragmentation severity value. The process proceeds to determine an amount of contention for access to a candidate file (e.g., by accessing the candidate file to record the amount of time it takes to obtain access). If the fragmentation severity value and the amount of contention suggestion a benefit from defragmentation, then the method initiating defragmentation operations on the candidate file. The method delays for a calculated wait time before performing a second defragmentation operation. Real-time monitors are used to determine when the contention is too high or when system utilization is too high. Only files that have ever been opened are considered candidates for defragmentation.

20 Claims, 7 Drawing Sheets

(56) References Cited

U.S. PATENT DOCUMENTS

2012/0158671 A1* 6/2012 Tzur et al. .................... 707/692
2012/0303889 A1* 11/2012 Coker et al. .................. 711/113

OTHER PUBLICATIONS

Jeffrey Pang et al., "Defragmenting DHT-based Distributed File Systems" 27th International Conference on Disbtributed Computing Systems (ICDCS'07), IEEE, 2007, 10 pages.

Xiao Ling et al., "Efficient Disk I/O Scheduling with QoS Guarantee for Xen-based Hosting Platforms" 2012 12th IEEE/ACM International Symposium on Cluster, Cloud and Grid Computing, IEEE, 2012, 9 pages.

Varun Mittal et al., "Heuristic user behavior based hard disk defragmentation mechanism" UKSim Fourth European Modeling Symposium on Computer Modelling and Simulation, IEEE, 2010, 3 pages.

Vivek Narasayya et al., "Workload Driven Index Defragmentation", ICDE Conference 2010, IEEE, 2010, 12 pages.

\* cited by examiner

SELF-GOVERNED CONTENTION-AWARE APPROACH TO SCHEDULING FILE DEFRAGMENTATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of computer file storage defragmentation and more particularly to techniques for implementing a self-governed contention-aware approach to scheduling file defragmentation.

BACKGROUND

Some embodiments of the present disclosure are directed to an improved approach for implementing a self-governed, contention-aware approach to scheduling file defragmentation.

Legacy defragmentation implementations attempt to coalesce (e.g., defragment) the entire disk by moving the contents of disk blocks around the physical storage spaces of the disk in order to create contiguous usage of space within files. Such legacy defragmentation approaches are unaware of the usage of files that are being defragmented. Often conventional approaches even require the file system to be offline. When the file system is offline, it is moot to consider the performance effect that the defragmentation operations have on the system, however taking a file system offline is highly undesirable, and improvements to avoid taking a file system offline are needed.

Some legacy approaches have attempted to perform defragmentation operations while online by requiring that the user identify a particular file to be defragmented and to explicitly issue a command to perform the defragmentation. While such a naive approach can prevent contentious access to the file until the entire defragmentation operation is completed, that approach fails to consider the user impact of many hundreds or thousands of files on a system disk. Indeed, legacy cases fail to consider the user impact of concurrently performing defragmentation of many hundreds or thousands of files on a system disk. What is needed is a technique for delaying defragmentation operations when the contention increases or when the system utilization gets above a threshold value.

Further, the aforementioned legacy techniques fail to implement techniques that permit defragmentation while online, and accordingly the aforementioned legacy techniques fail to fairly schedule workload or otherwise consider system resource sharing while online. Specifically, the aforementioned technologies do not have the capabilities to perform a self-governed, contention-aware approach to scheduling file defragmentation of an online volume. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for a self-governed, contention-aware approach to scheduling file defragmentation.

Disclosed herein are methods, systems, and computer program products for file storage defragmentation on a cluster of nodes. The method for self-governed, contention-aware scheduling of file defragmentation operations commences by calculating a score for candidate files of a storage volume, where the score is based on a fragmentation severity value. The process proceeds to determine an amount of contention for access to a candidate file (e.g., by accessing the candidate file to record the amount of time it takes to obtain access). If the fragmentation severity value and the amount of contention suggest a benefit from defragmentation, then the method initiating defragmentation operations on the candidate file begins. The method delays for a calculated wait time before performing a second defragmentation operation. Real-time monitors are used to determine when the contention is too high or when system utilization is too high. Only files that have ever been opened are considered candidates for defragmentation.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing a self-governed, contention-aware approach to scheduling file defragmentation. More particularly, disclosed herein are exemplary environments, methods, and systems.

Overview

Described herein-below and in the accompanying figures are scalable methods and apparatus for implementing a self-governed, contention-aware approach to scheduling file defragmentation.

The approach disclosed herein automatically identifies (e.g., without user intervention) active files that will benefit from defragmentation and schedules defragmentation operations in a fair manner that accounts for system load. That is, rather than blindly scheduling and/or performing defragmentation on all files, the embodiments as disclosed herein determine if and which of certain files might never (or very rarely) be accessed and therefore would not accrue benefit even if defragmented.

The techniques disclosed herein can perform defragmentation while the system is fully operational—and does not require that the file system be offline or that users need to exit from their applications. In addition to the productivity benefits that arise from defragmentation itself, the disclosed system monitors current conditions of the system (e.g., contention conditions, performance headroom conditions, general health of the system, etc.), thus governing the defragmentation processes so as to become more or less aggressive. Effective application of governing rules results in managed performance impacts to the file system and to the system and its users as a whole. In exemplary situations, an individual file will be defragmented incrementally (e.g., in chunks or extents) so as to allow access to the file throughout the defragmentation procedures. During periods when the system is deemed idle or is lightly utilized, the defragmentation procedures take advantage of such idle conditions and spawns activities to aggressively defragment targeted files. The files in a file system or volume are continually monitored for fragmentation, and if a particular subject file were to become detectably fragmented at a future time, the monitor would consider the usage profile of the file vis-à-vis other files in the file system, and the monitor might schedule defragmentation operations to be performed on the subject file.

Still more improvements come to bear by adhering to the herein-disclosed approach in that this system would defer until later (e.g., until a less busy time or until an otherwise idle time) the defragmenting of files that would not benefit (or would only benefit marginally) from contiguous storage. Such a situation can occur when a file is never or rarely accessed.

Still more, by adhering to the herein-disclosed approach, a customer or user or system administrator no longer needs to schedule a time to defragment their file system since defragmentation will be done continuously and in the background so as not to drag down or otherwise interfere with system users. Still more, ongoing monitoring of contention allows defragmentation to during periods of low usage times (e.g., at night, or on weekends, or during any periods when the subject file is not being accessed). The foregoing can be performed without the need for manual identification of any specific periods of time, and without the need for manual identification of candidate files to be defragmented.

Definitions

Some of the terms used in this description are defined below for easy reference. The presented terms and their respective definitions are not rigidly restricted to these Definitions—a term may be further defined by the term's use within this disclosure.

The term "file" means any a collection of data stored in any combination of disk blocks stored on a volume.

The term "volume" means any a container of disk blocks that can be used to store structured information such as files.

The term "logic" means any combination of software or hardware that is used to implement all or part of the embodiments of the present disclosure.

A "module" includes any mix of any portions of computer memory and any extent of circuitry including hardwired logic or circuitry embodied as a processor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

In addition, the articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

Figure 1:
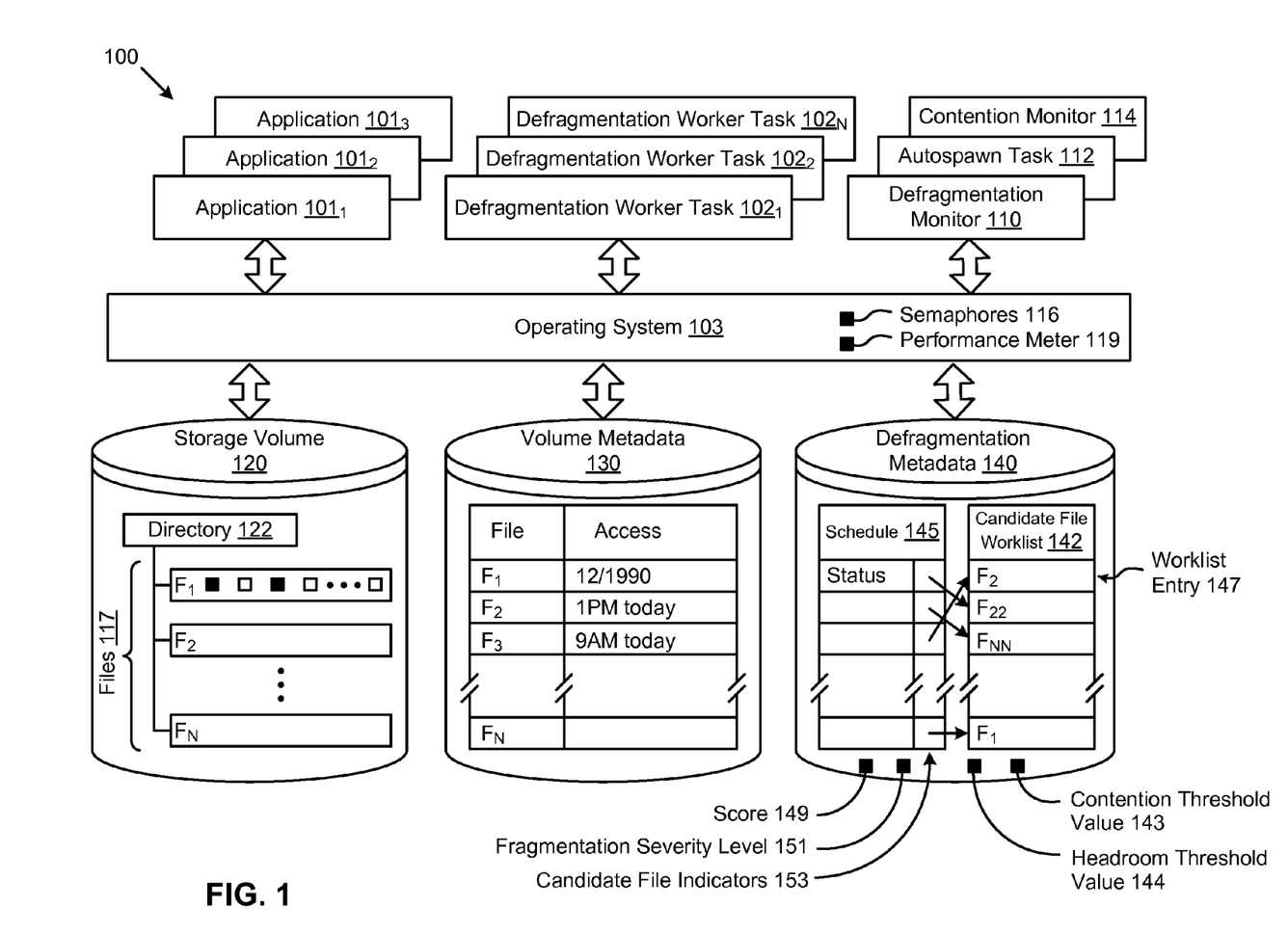
FIG. 1 is a block diagram of an environment for implementing a self-governed, contention-aware approach to scheduling file defragmentation, according to some embodiments.

FIG. 1 is a block diagram of an environment 100 for implementing a self-governed, contention-aware approach to scheduling file defragmentation. As an option, the present environment 100 may be implemented in the context of the architecture and functionality of the embodiments described herein. Also, the environment 100 or any aspect therein may be implemented in any desired environment.

As shown, an operating system 103 interfaces between applications 101 (e.g., application $101_1$, application $101_2$, application $101_3$,) and a storage volume 120. The environment 100 depicts a single instance of storage volume 120, however multiple storage volumes can be present in this or another environment. As is known-in-the-art, a storage volume is associated with a directory 122, which in turn references files 117. A particular file (e.g., file $F_1$, file $F_2$, etc.) can be stored on the storage volume across a number of blocks, which blocks are not necessarily contiguous in physical layout. This is a common situation, and arises from the natural effects of stochastic operation of the applications 101. In addition to a directory, a storage volume may have associated metadata (e.g., volume metadata 130), and the metadata can associate a particular file with a variety of file attributes. Shown in the inset for the volume containing metadata is the file attribute "Access", which attribute serves to store the last date and time of access by an application. As shown, the file $F_1$ had its last access on 12/1990.

In addition to the storage of volume metadata 130, the environment 100 comprises storage for defragmentation metadata 140. Strictly as an example, defragmentation metadata might comprise data structures that serve to store a list or ordered set of files (e.g., identified by some form of a candidate file name or candidate file indicator) in a candidate file worklist datastructure 142 (e.g., candidate file $F_2$, candidate file $F_{NN}$, candidate file $F_1$, etc.), as shown. The defragmentation metadata 140 can further comprise a schedule 145 for prioritizing items (e.g., worklist entries) in the candidate file worklist datastructure, a contention threshold value 143 and a headroom threshold value 144.

The foregoing established an environment in which a background thread (e.g., defragmentation monitor 110) is started. The background thread (e.g., defragmentation monitor 110) accesses the directory in the storage volume 120 and possibly also the volume metadata 130 to look for files to place into a worklist. As the background thread (e.g., defragmentation monitor 110) looks for files to place into a worklist, it considers the recency or frequency of access as well as the fragmentation state of the considered file. For example, the background thread (e.g., defragmentation monitor 110) might note that the file $F_1$ is severely fragmented and, on that basis alone, might place the file $F_1$ into the worklist. However, the background thread (e.g., defragmentation monitor 110) might note that the file $F_1$ is rarely accessed and, on that basis alone, might not place the file $F_1$ into the worklist. In some embodiments a more general approach might be to calculate a score 149 for each instance of the files 117 on the basis of the combination of recency or frequency of access together with a fragmentation severity value 151. For example, a file that is both severely fragmented, and is recently and/or frequently accessed might be placed on the worklist near the top so as to increase the likelihood that the file would be a candidate for defragmentation.

In many cases, a file is very frequently accessed, and in some cases the access models include usage of locks or semaphores 116 to guarantee serial access. To gain a measure of the current amount of contention (e.g., a measure that predicts the likelihood of future contention), the defragment thread will access the file and record the amount of time (e.g., wait time) it takes to obtain access. Then, based on the wait time and a system utilization value from the operating system's performance meter 119, the defragment thread will delay itself before attempting an access to the file again. Once exclusive access to the file is granted (e.g., using known operating system techniques) the thread will scan the extents of the accessed file looking for a range of multiple extents that can be combined into an unused or newly created single extent. Using known-in-the art techniques, the data will be moved into the newly created extent and the old extents freed back to the file system. The thread will then delay (e.g., in order to avoid heavily loading the system) or move on to another file. In the case of executing a delay, the thread can keep track of where it left off on the subject file. In some embodiments (see FIG. 4) only one extent will be defragmented during a single exclusive access period, thus reducing the impact on other processes that attempt accesses of the subject file for exclusive access.

The aforementioned background thread can implement a monitor function. And/or the aforementioned background thread (or threads) can implement an autospawn task 112, and/or a contention monitor 114, and/or can implement one or more defragmentation worker tasks 102 (e.g., defragmentation worker task $102_1$, defragmentation worker task $102_2$, defragmentation worker task $102_N$). Or a monitor function can be implemented as a dedicated defragmentation monitor, which is briefly discussed in conjunction with FIG. 2.

Figure 2:
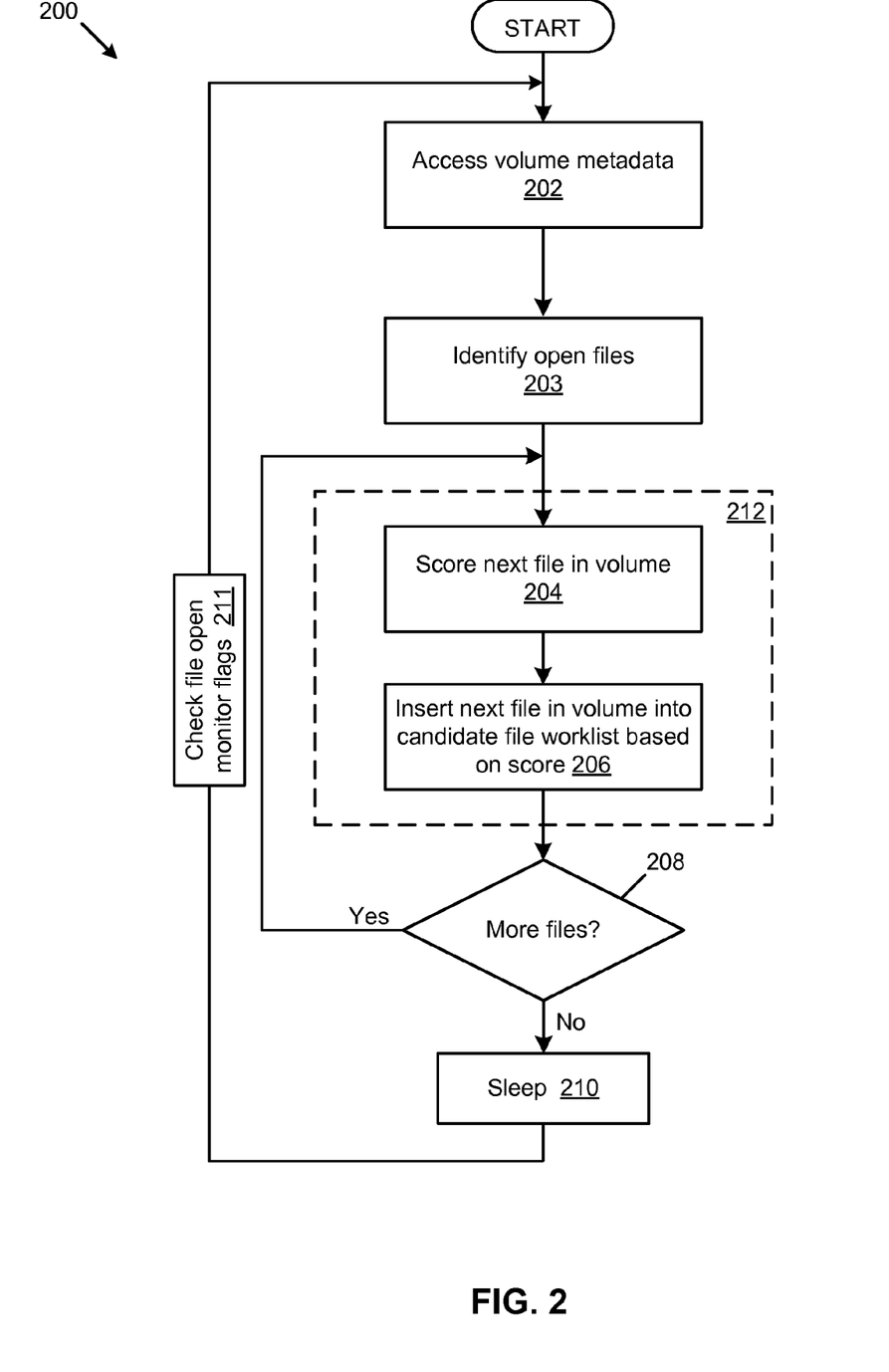
FIG. 2 is a flow chart depicting selected procedures of a defragmentation monitor for implementing a self-governed, contention-aware approach to scheduling file defragmentation, according to some embodiments.

FIG. 2 is a flow chart 200 depicting selected procedures of a defragmentation monitor for implementing a self-governed, contention-aware approach to scheduling file defragmentation. As an option, the present flow chart 200 may be implemented in the context of the architecture and functionality of the embodiments described herein. Also, the flow chart 200 or any aspect therein may be implemented in any desired environment.

As shown the defragmentation monitor of FIG. 2 accesses a volume directory or volume metadata (see operation 202). One embodiment scans the entire directory and adds any "ever opened" files to a candidate file worklist datastructure (see operation 206). In some cases the entire directory is quite large, comprising a huge number of files, so in order to avoid scanning the entire file system for candidate "ever opened" files, one approach considers only files that are currently open or are soon going to be opened (see operation 203). One such embodiment monitors system "file open" commands (e.g., via a check file open monitor flag of operation 211) and adds subject files to a candidate file worklist datastructure at or after the time the file open monitor detects the file open command. As a consequence, files that are not open, or have never been opened, or are not soon to be opened (and accessed) need not be considered as a candidate for defragmentation. In exemplary embodiments candidate files are files selected using all techniques of (1) accessing volume metadata, (2) detecting an open flag (or ever opened flag), or (3) monitoring for a file open command.

Selection of a next file proceeds iteratively (as shown in the loop from decision 208). In an iteration, the next file is scored (see operation 204) considering both the fragmentation severity value and its recency (and frequency) of access. Then the defragmentation monitor can place or insert a candidate file indicator 153 (e.g., a file name or a file pointer or other file indication) into the candidate file worklist datastructure 142. So long as there are more files to process (see decision 208), the defragmentation monitor continues to process the next file and place or insert a candidate file indicator 153 into the candidate file worklist (see operation 206). When it occurs that there are no more unscored files found in the volume directory the defragmentation monitor can elect to delay or sleep (see operation 210) for a period, check the "file open" monitor and then again access the volume directory afresh for another series of iterations.

By processing a volume in such a manner, the defragmentation monitor can run perpetually, and will be able to identify newly created files. Other bookkeeping tasks can be performed by the defragmentation monitor, such as removing a file indication from the candidate file worklist in the event that a file had been deleted.

The operations inside the iteration loop 212 can be coded so as to identify if a formerly scored file has seen activity (e.g., accesses or fragmentation, or defragmentation, or deletion, etc.) such that its worklist entry 147 in the candidate file worklist should be moved (e.g., up or down) or if its worklist entry should be deleted from candidate file worklist.

Figure 3:
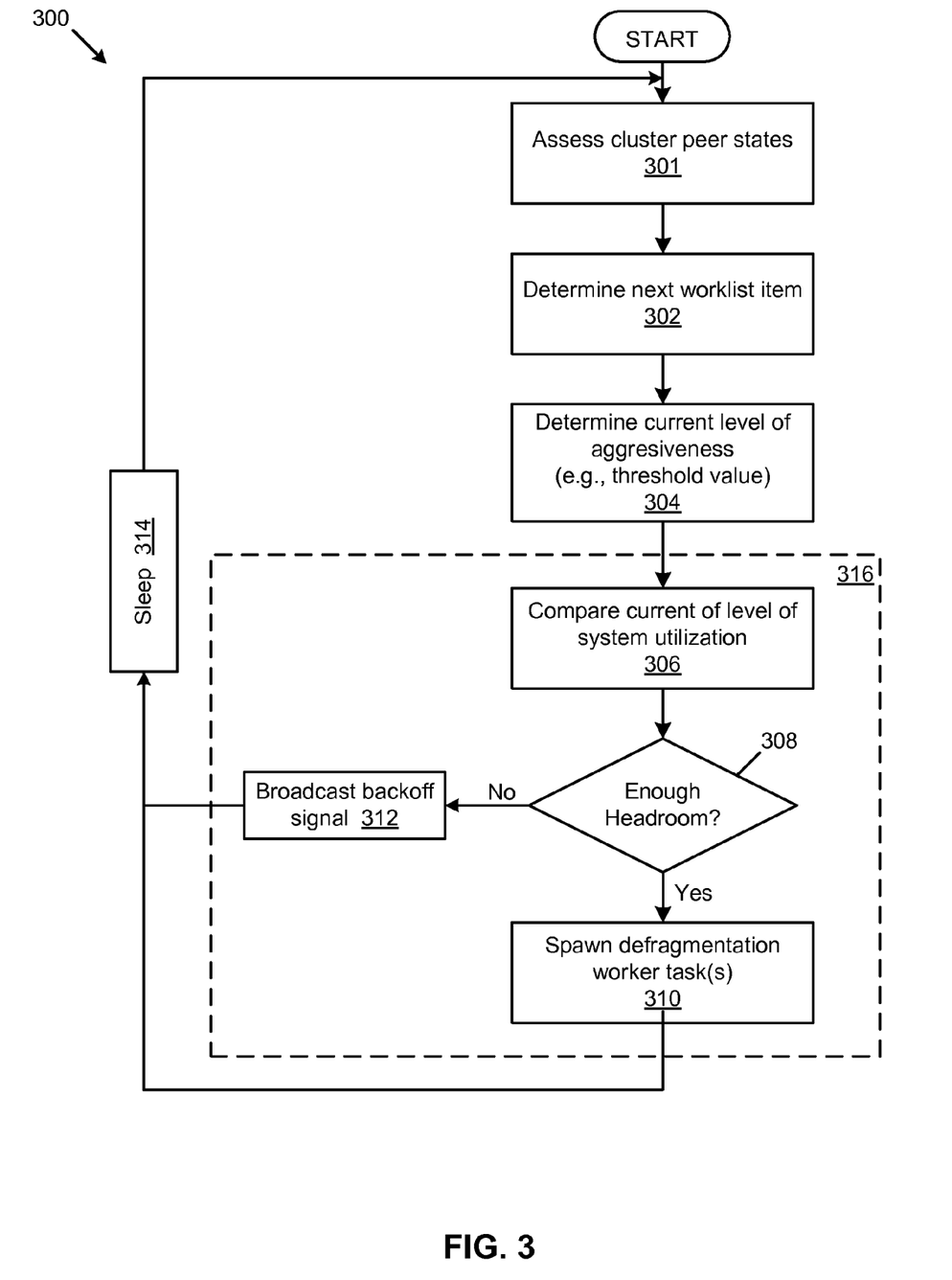
FIG. 3 is a flow chart depicting certain procedures of an autospawn task for implementing a self-governed, contention-aware approach to scheduling file defragmentation, according to some embodiments.

FIG. 3 is a flow chart 300 depicting certain procedures of an autospawn task for implementing a self-governed, contention-aware approach to scheduling file defragmentation. As an option, the present flow chart 300 may be implemented in the context of the architecture and functionality of the embodiments described herein. Also, the flow chart 300 or any aspect therein may be implemented in any desired environment.

In the embodiment of FIG. 1, there is shown an autospawn task 112. In the embodiment as discussed in this FIG. 3, the autospawn task can run perpetually, and it automatically determines when to spawn activity to perform defragmentation, and/or when to merely delay or sleep 314. In this manner, the autospawn task at least in part governs the defragmentation workload.

As shown, the autospawn task commences by assessing cluster peer states (see operation 301). In some implementations an instance of a defragmentation worker task runs on each node of the cluster, and an inter-process technique (e.g., signaling, sending messages, use of semaphores, etc.) are used to manage the number of defragmentation worker tasks that are performing defragmentation at any given moment of time. For example, it is possible to have only have one defragmentation worker task active at any given moment of time, while the other defragmentation worker tasks are quiescent or merely monitor the health of its node (e.g., to provide a heartbeat, which would cease to beat if the node fails or is taken out of the cluster configuration). In other cases it is possible to have multiple defragmentation worker tasks active at any given moment of time. Using such techniques as described in the foregoing, the scope of contention awareness spans the entire cluster.

The autospawn task continues by executing an operation to determine the next item in the worklist (see operation 302). The term "next item" is a relative term, and refers to the next items to be processed for defragmentation. In some implementations the next item might be the sequentially next item (as in the case of an ordered list) or it might be the next item as indexed by an iterator, or it might be the next item as is pointed to by a separate data structure. In some situations, a candidate file worklist might be maintained as a coarse-grain listing order of the files to be processed, and a separate data structure such as a schedule datastructure 145 might comprise a fine-grain listing order of the files to be processed.

As earlier indicated, the herein-disclosed techniques implement a self-governed approach to scheduling file defragmentation, and the algorithm as shown in FIG. 3 serves to facilitate the self-governing of scheduling file defragmentation by:

- Determining an acceptable level of aggressiveness for scheduling and performing file defragmentation (see operation 304).
- Determining the current level of system utilization (see operation 306) for comparison to an acceptable level of aggressiveness to determine if there is enough headroom (see decision 308), and if so, sending signals to instances of defragmentation worker tasks, or spawning additional instances of defragmentation worker tasks (see operation 310) only when there is deemed to be sufficient headroom (e.g., see headroom threshold value 144). The aforementioned assessment of cluster peer states, and/or any determinations derived from such an assessment (see operation 301) can be used in decision 308.
- Spawning additional instances of defragmentation worker tasks more aggressively when there is deemed to be sufficient headroom or less aggressively when there is deemed to be insufficient headroom.
- Broadcasting a backoff signal (see operation 312) to previously-spawned defragmentation worker tasks when it is deemed that there is not sufficient headroom.
- Sleeping a short duration of time between iterations.

The routine 316 and its retrieved metadata can be tuned so as to spawn defragmentation worker tasks more (or less) aggressively, and/or can be modified to send a backoff with an amplitude that is received by the receiving defragmentation worker tasks, which defragmentation worker tasks in turn backoff of their operations as a relatively higher (or lower) rate in a manner responsive to the amplitude.

Figure 4:
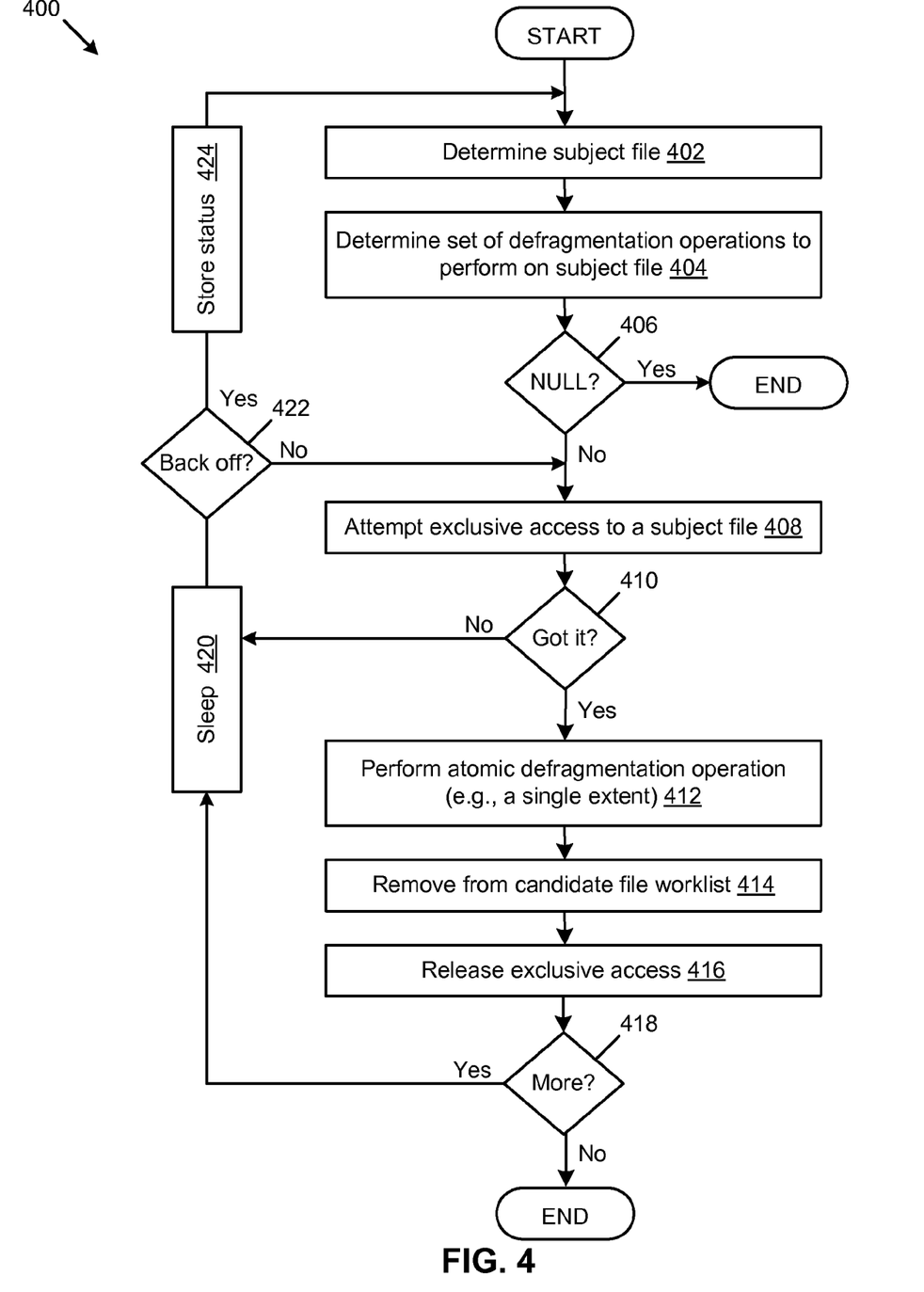
FIG. 4 is a flow chart depicting certain operations and decisions of a defragmentation worker task used in implementing a self-governed, contention-aware approach to scheduling file defragmentation, according to some embodiments.

FIG. 4 is a flow chart 400 depicting certain operations and decisions of a defragmentation worker task used in implementing a self-governed, contention-aware approach to scheduling file defragmentation. As an option, the present flow chart 400 may be implemented in the context of the architecture and functionality of the embodiments described herein. Also, the flow chart 400 or any aspect therein may be implemented in any desired environment.

Any instance of a defragmentation worker task can perform defragmentation operations on a subject file. Furthermore, any instance of a defragmentation worker task can self-govern—and can autonomously manage contention—by adhering to the herein-disclosed contention-aware approach.

As shown, the defragmentation worker task determines a subject file. In some cases, a subject file identifier is provided to the defragmentation worker task as a message or signal, and the operation 402 serves to determines a subject file merely by retrieving the given subject file identifier. In other cases the defragmentation worker task receives a subject file identifier upon task creation. In still other cases, operation 402 serves to determine a subject file by consulting the schedule datastructure 145. Once the subject file identifier is known, then the defragmentation worker task determines the defragmentation worker task or tasks to be performed (see operation 404). It is possible that the defragmentation work had been completed in a previous iteration, and it is possible that the subject has been deleted or marked for deletion, in which cases the defragmentation worker task has a NULL worklist (see decision 406), and the defragmentation worker task can end (e.g., terminate, loop, pend, etc.).

Given the determination of a non-null set of defragmentation operations to be performed, operation 408 serves to acquire exclusive access to the subject file. If exclusive access is granted (see decision 410), then the defragmentation worker task proceeds to perform atomic defragmentation operations (see operation 412). The term "atomic" or "atomic operation" refers to any operation that is deemed to be sufficiently small so as to be performed during a single period of time when the defragmentation worker task has secured exclusive access to the subject file. If the defragmentation worker task determines that the completion of the last atomic operation is the last defragmentation operation to be performed on the subject file, then the defragmentation worker task can remove the subject file worklist entry from the candidate file worklist (see operation 414). Regardless whether or not the completion of the last atomic operation is the last defragmentation operation to be performed on the subject file, the exclusive access to the subject file can be released (see operation 416). Of course, it is typical that the last atomic operation was not the last defragmentation operation (see decision 418), and in this embodiment, the defragmentation worker task will delay or sleep for a duration (see operation 420) and then determine if a backoff message had been broadcast (see decision 422). If not, then the defragmentation worker task again attempts to acquire exclusive access to the subject file (again, see operation 408). If YES, then store applicable state pertaining to the in-progress operations (see operation 424). The stored state can be stored in a datastructure within defragmentation metadata 140.

Figure 5:
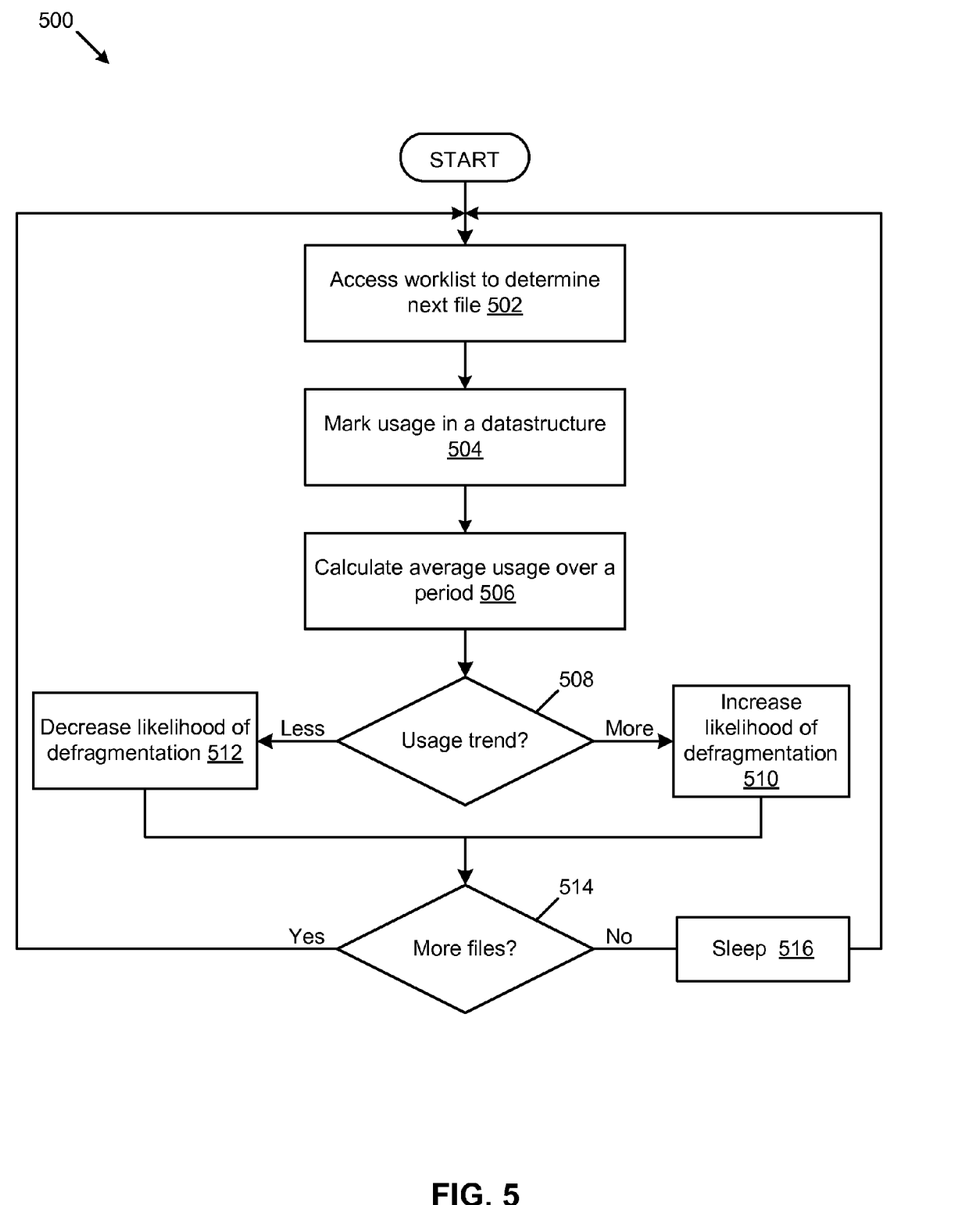
FIG. 5 is a flow chart depicting certain operations and decisions of a contention monitor used in implementing a self-governed, contention-aware approach to scheduling file defragmentation, according to some embodiments.

FIG. 5 is a flow chart 500 depicting certain operations and decisions of a contention monitor used in implementing a self-governed, contention-aware approach to scheduling file defragmentation. As an option, the present flow chart 500 may be implemented in the context of the architecture and functionality of the embodiments described herein. Also, the flow chart 500 or any aspect therein may be implemented in any desired environment.

A contention monitor 114 serves to assess the likelihood of future file contention based on past occurrence (or lack of) of contention events. Files that appear as "next" in the candidate file worklist have already been scored as being in need of defragmentation (at least more on need of defragmentation that a later occurring "next" file). In this sense, the worklist is a coarse-grain listing order of the files to be processed. A separate data structure such as a schedule datastructure 145 might comprise a fine-grain listing order of the files to be processed on the basis of near-term or fine-grain measurements.

Strictly as an example, contention monitor 114 might commence to access the candidate file worklist to determine a next file to work with (see operation 502) and then mark an indication of contention/usage in a datastructure (see operation 504). In most systems, a single measurement might not be enough to establish a trend or a likelihood, so the contention monitor 114 might take additional measurements, and calculate an average over a period of time (see operation 506). In the event that an increasing trend emerges as statistically reliable (see decision 508), then the contention monitor 114 might decrease the likelihood of scheduling a defragmentation operation (see operation 512), for example, by ordering or linking entries in a fine-grain schedule datastructure). Conversely, in the event that a decreasing contention trend emerges as statistically reliable (see decision 508), then contention monitor 114 might increase the likelihood of scheduling a defragmentation operation (see operation 510), such as by ordering or linking entries in a fine-grain schedule datastructure. Following such a regime, it can be seen that files that have high usage (for example) during daytime working hours would be lowered in terms of likelihood to be accessed for defragmentation. However, in off hours (e.g., outside of daytime working hours) the contention monitor 114 would increase the likelihood to be accessed for defragmentation.

When there are no more files to assess at that moment in time (see decision 514) then the contention monitor sleeps for a duration (see operation 516).

Additional Embodiments of the Disclosure

Figure 6:
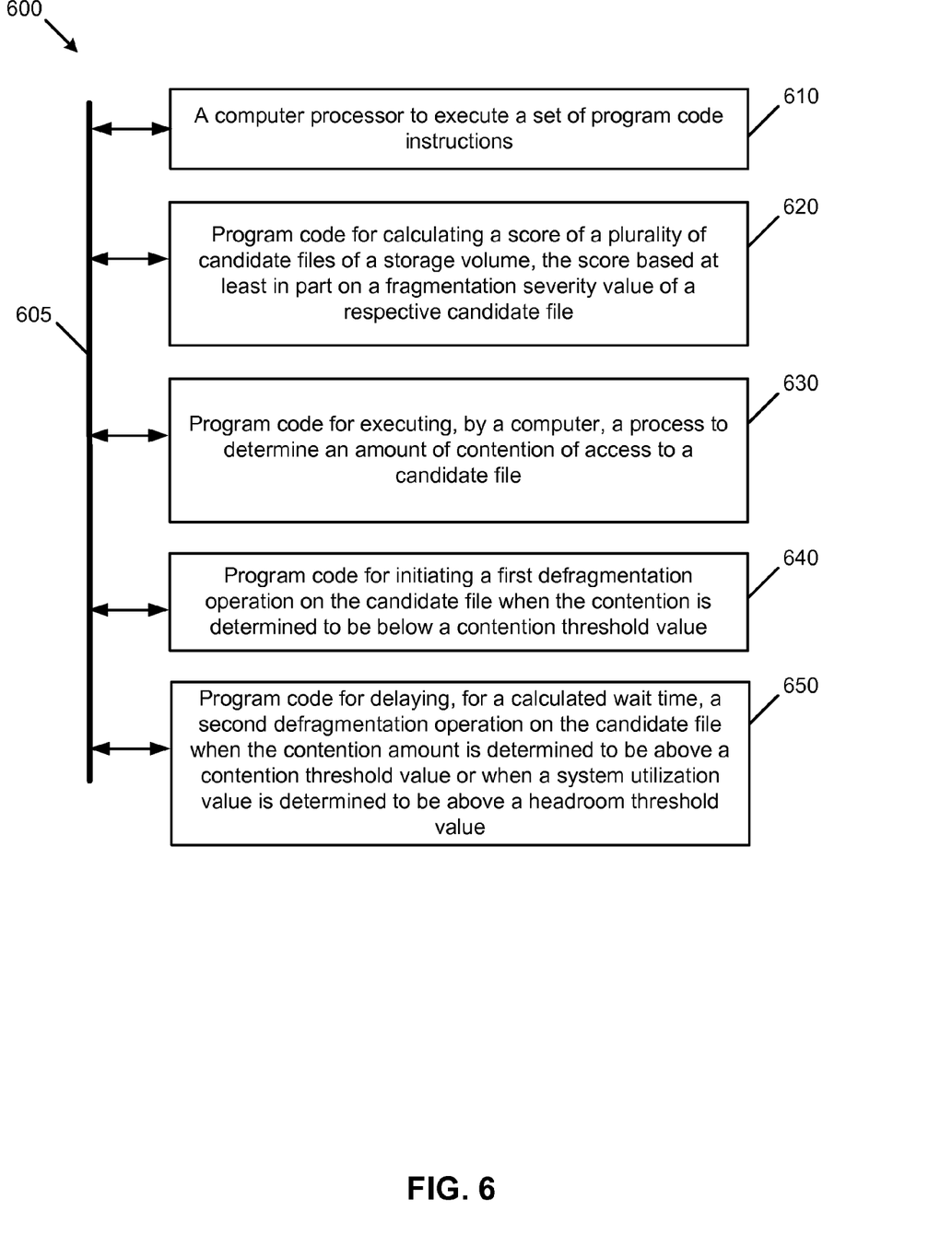
FIG. 6 is a flow chart system a self-governed, contention-aware approach to scheduling file defragmentation operations, according to some embodiments.

FIG. 6 is a flow chart system a self-governed, contention-aware approach to scheduling file defragmentation operations. As an option, the present system 600 may be implemented in the context of the architecture and functionality of the embodiments described herein. Of course, however, the system 600 or any operation therein may be carried out in any desired environment. As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: calculating a score for selecting a plurality of candidate files of a storage volume, the score based at least in part on a fragmentation severity value of a respective candidate file (see module 620); executing a process to determine an amount of contention for access to a candidate file (see module 630); initiating a first defragmentation operation on the candidate file when the contention is determined to be below a contention threshold value (see module 640); and delaying, for a calculated wait time, a second defragmentation operation on the candidate file when the contention amount is determined to be above a contention threshold value or when a system utilization value is determined to be above a headroom threshold value (see module 650).

System Architecture Overview

Figure 7:
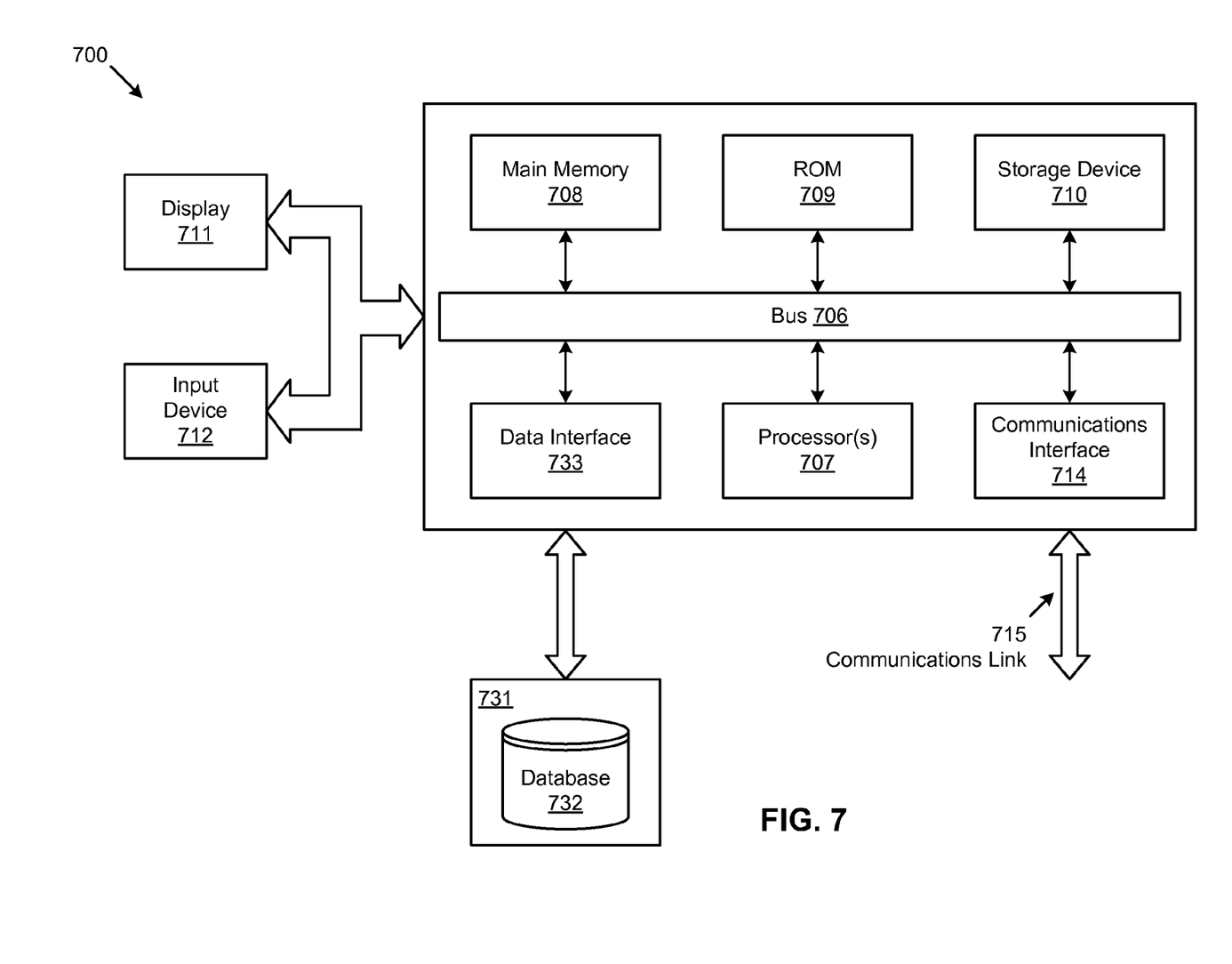
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for self-governed, contention-aware scheduling of file defragmentation, comprising:
   selecting a plurality of candidate files of a storage volume for performing defragmentation operations, using a score calculated by combining a frequency or recency of access and a fragmentation severity value of a respective candidate file;
   executing, by a computer, a process to determine an amount of contention of access to a candidate file of the plurality of candidate files, wherein the amount of contention indicates an amount of time to obtain access to the candidate file;
   initiating a defragmentation operation on the candidate file if the contention is determined to be below a contention threshold value;
   initiating the defragmentation operation after delaying, for a calculated wait time, the defragmentation operation on the candidate file if the amount of time to obtain access to the candidate file is above the contention threshold value;
   determining, after initiating the defragmentation operation on the candidate file, a system utilization value; and
   initiating a second defragmentation operation if the system utilization value is below a headroom threshold value, and delaying the initiation if the system utilization value is above the headroom threshold value.

2. The method of claim 1, wherein the candidate files are files selected using at least one of, an aspect of volume metadata, an open flag, or monitoring of a file open command.

3. The method of claim 1, wherein the amount of contention of access to the candidate file is determined based at least in part on accessing the candidate file to record the amount of time it takes to obtain exclusive access to the candidate file.

4. The method of claim 1, wherein the amount of contention of access to the candidate file is determined based at least in part on a measure that predicts a likelihood of future contention.

5. The method of claim 1, wherein the system utilization value is based at least in part on a value from an operating system performance meter.

6. The method of claim 1, wherein the calculated wait time is zero when a respective node of a cluster associated with the plurality of files is deemed idle.

7. The method of claim 1, wherein calculating the score of the plurality of candidate files is based at least in part on an ever opened flag.

8. A computer system for self-governed, contention-aware scheduling of file defragmentation, comprising:
   a computer processor to execute a set of program code instructions; and
   a memory to hold the program code instructions, in which the program code instructions comprises program code to perform,
   selecting a plurality of candidate files of a storage volume for performing defragmentation operations, using a score calculated by combining a frequency or recency of access and a fragmentation severity value of a respective candidate file;
   executing, by a computer, a process to determine an amount of contention of access to a candidate file of the plurality of candidate files, wherein the amount of contention indicates an amount of time to obtain access to the candidate file;
   initiating a defragmentation operation on the candidate file if the contention is determined to be below a contention threshold value;
   initiating the defragmentation operation after delaying, for a calculated wait time, the defragmentation operation on the candidate file if the amount of time to obtain access to the candidate file is above the contention threshold value;
   determining, after initiating the defragmentation operation on the candidate file, a system utilization value; and
   initiating a second defragmentation operation if the system utilization value is below a headroom threshold value, and delaying the initiation if the system utilization value is above the headroom threshold value.

9. The computer system of claim 8, wherein the candidate files are files selected using at least one of, an aspect of volume metadata, an open flag, or monitoring of a file open command.

10. The computer system of claim 8, wherein the amount of contention of access to the candidate file is determined based at least in part on accessing the candidate file to record the amount of time it takes to obtain exclusive access to the candidate file.

11. The computer system of claim 8, wherein the amount of contention for access to the candidate file is determined based at least in part on a measure that predicts a likelihood of future contention.

12. The computer system of claim 8, wherein system utilization value is based at least in part on a value from an operating system performance meter.

13. The computer system of claim 8, wherein the calculated wait time is zero when a respective node of a cluster associated with the plurality of files is deemed idle.

14. The computer system of claim 8, wherein calculating the score of the plurality of candidate files is based at least in part on an ever opened flag.

15. A computer program product embodied in a non-transitory computer readable medium, the computer readable medium having stored thereon a sequence of instructions which, when executed by a processor causes the processor to execute self-governed, contention-aware scheduling of file defragmentation, the process comprising:
   selecting a plurality of candidate files of a storage volume for performing defragmentation operations, using a score calculated by combining a frequency or recency of access and a fragmentation severity value of a respective candidate file;
   executing, by a computer, a process to determine an amount of contention of access to a candidate file of the plurality of candidate files, wherein the amount of contention indicates an amount of time to obtain access to the candidate file;
   initiating a defragmentation operation on the candidate file if the contention is determined to be below a contention threshold value; and
   initiating the defragmentation operation after delaying, for a calculated wait time, the defragmentation operation on the candidate file if the amount of time to obtain access to the candidate file is above the contention threshold value;

determining, after initiating the defragmentation operation on the candidate file, a system utilization value; and initiating a second defragmentation operation if the system utilization value is below a headroom threshold value, and delaying the initiation if the system utilization value is above the headroom threshold value.

16. The computer program product of claim 15, wherein the candidate files are files selected using at least one of, an aspect of volume metadata, an open flag, or monitoring of a file open command.

17. The computer program product of claim 15, wherein the amount of contention of access to the candidate file is determined based at least in part on accessing the candidate file to record the amount of time it takes to obtain exclusive access to the candidate file.

18. The computer program product of claim 15, wherein the amount of contention of access to the candidate file is determined based at least in part on a measure that predicts a likelihood of future contention.

19. The computer program product of claim 15, wherein system utilization value is based at least in part on a value from an operating system performance meter.

20. The computer program product of claim 15, wherein the calculated wait time is zero when a respective node of a cluster associated with the plurality of files is deemed idle.

* * * * *